May 8, 1951

H. W. LINDSAY 2,551,845

RECORDING HEAD ASSEMBLY

Filed March 21, 1949

INVENTOR,
HAROLD W. LINDSAY.
BY
Lippincott & Smith.
ATTORNEYS

Patented May 8, 1951 2,551,845

UNITED STATES PATENT OFFICE 2,551,845

RECORDING HEAD ASSEMBLY

Harold W. Lindsay, Redwood City, Calif., assignor to Ampex Electric Corporation, San Carlos, Calif., a corporation of California Application March 21, 1949, Serial No. 82,695

7 Claims. (Cl. 179—100.2)

Figure 1:
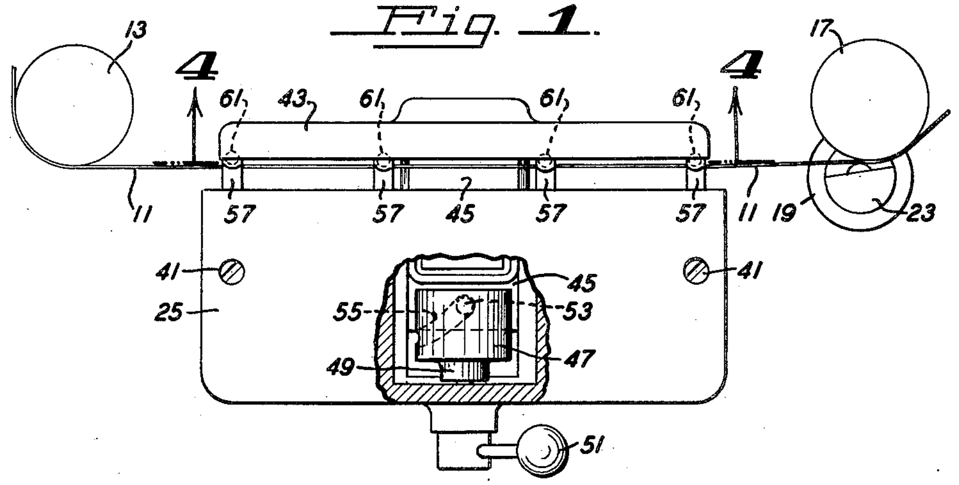

This invention relates to a recording head assembly particularly adaptable for use with magnetic recording mechanisms. Devices of this type are used frequently as sound recorders, reproducers, or the like.

In mechanisms of this variety a flexible and elastic tape, usually having a thickness of the order of one, two, or three thousandths of an inch and a width of about one quarter of an inch, is directed through the mechanism so as to pass across various magnetic heads. These magnetic heads are usually for the purpose of preconditioning the tape and erasing any previously recorded messages, recording new messages, and reproducing the last recorded messages.

The magnetic tape is usually formed of paper or of plastic such as a cellulose or a cellulose acetate with one side thereof being coated, usually with iron oxide. Devices of this type generally have a pay-off or supply reel whereupon the tape to be utilized has been wound and from which it is supplied to the utilization mechanism. When the tape has been passed through the utilization mechanism and moved relative to the various magnetic heads, it is then fed to or guided upon a suitable take-up spool or reel for storage.

This invention is directed particularly to ways and means for quickly threading the magnetic tape into the mechanism so that the threaded tape may be properly positioned relative to the various magnetic heads. Accordingly, the construction and formation of the various magnetic heads specifically plays no part in the invention other than to provide a surface relative to which the magnetic tape is to be moved. Therefore, it may merely be stated that the magnetic heads are formed of iron cores where the gap between the core sections is generally a function of the type of use to which the particular magnetic head is to be placed. The greatest spacing is usually provided for the erasing head and the least spacing is usually provided for the reproducing head. Various non-magnetic materials, such as a berrylium-copper mixture or alloy, as is known in the art, may be used to support and separate the adjacent pole pieces.

As the invention herein sets forth, provision is made whereby a magnetic tape may be quickly loaded and positioned relative to a backing plate of a main body and supported in such a way that by means of a quick release opening and closing device the tape, after loading, can be quickly moved to a position to contact and be located to move across the various magnetic heads for recording, reproducing and erasure purposes, or any of them. It is important that the mechanism for control be such that quick loading can be accomplished, because it frequently becomes extremely important that delays between the completion of one tape and the commencement of another tape be minimized or where a tape is removed to patch or for any other purpose it may be rapidly replaced. The present invention reduces the threading time to a minimum.

Also, the invention provides an extremely simple mechanism for achieving the aims and objectives above recited and it makes possible the rapid threading, or, in the alternative, the removing of a tape without materially increasing the cost of the mechanism adopted.

Figure 2:
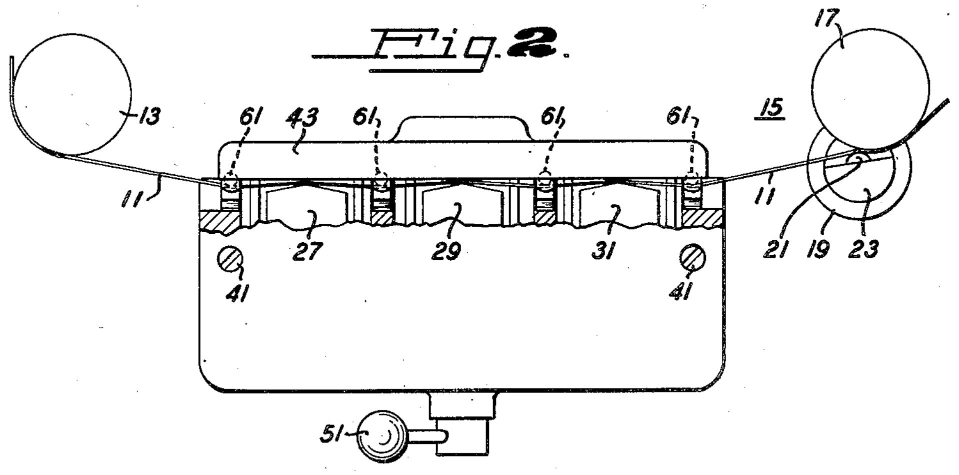
Figure 3:
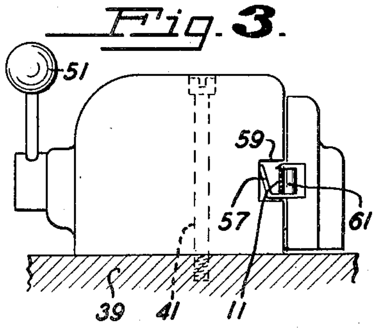
Figure 4:
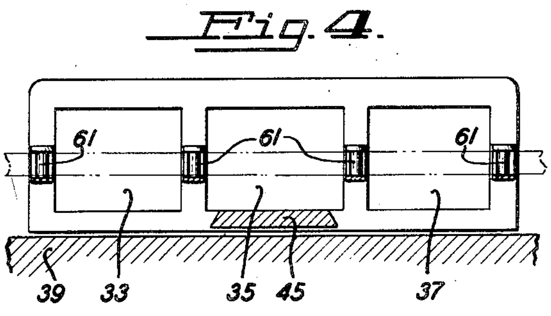

The invention has been set forth in one of its preferred forms by the accompanying drawings wherein Fig. 1 is a plan view, partially open at one side, to show the backing plate and its release mechanism; Fig. 2 is also a plan view showing the backing plate closed upon the magnetic heads, with the top portion partially open to show particularly and yet schematically the relative positioning of the magnetic heads and the tape; Fig. 3 is an end view of the arrangement of Fig. 2 looking from right to left; and Fig. 4 is a view taken on the line 4—4 of Fig. 1 looking in the direction of the arrows.

Now referring to the drawings for a further understanding of the invention, the tape strip 11, which, as above stated, is flexible or elastic and preferably formed of paper or plastic coated on one side with an iron oxide or its equivalent, is fed from a spool or pay-off reel (not shown) over an idler 13 and thence over a driving mechanism 15 and an idler 17 to a take-up reel or spool (not shown). The driving means 15 may, by way of example, be that described in applicant's co-pending specification entitled "Alining Mechanism for Tape Recordings" filed March 21, 1949, Serial No. 82,692. Suffice it to say, therefore, that the schematically represented arrangement hereof comprises a synchronous motor, which is not of itself shown, but of which a portion of the mounting is represented at 19. The motor drives a capstan 21 which is protected from accidental contact by a partially cylindrical shield 33 surrounding it except on the side which contacts the tape 11. The magnetic tape 11 is moved in the direction of the arrow.

The body member for supporting housing 25 is represented as containing several schematically represented magnetic heads 27, 29 and 31 which, by way of example, may be assumed to be used for the purposes, respectively, of erasing messages previously recorded on the tape 11, recording new messages on the tape and reproducing those messages which have been so recorded. The magnetic heads are fixedly positioned within the body or support housing and occupy generally a space comparable to that indicated within the rectangular outlines 33, 35 and 37, for instance, of Fig. 4. This main body member for supporting may then be attached (where desired) to a base member 39 by any stable form of fastening device, such as the pin 41, conventionally represented.

A backing gate member or backing plate 43 is suitably carried upon the body 25 and arranged, for instance, for slidable motion relative thereto upon the slide 45. This slide is caused to be moved in and out with respect to the body or housing 25 by means of a cam 47 which is rotated about a shaft 49 by means of a handle 51, so that, as a result of rotation and because the cam pin 53 is rigidly attached to the slide 45, the slide will be caused to move in and out by a distance represented by the pitch of the cam slot 55 wherein the pin or follower 53 moves. Accordingly, a counter-clockwise rotation of the handle 51 will cause the backing gate member or backing plate to move to a juxtaposed position relative to the body, or, in other words, move adjacent to the body. When it is desired to open the backing plate or backing gate relative to the body the handle 51 is naturally rotated in the opposite or clockwise direction, as is represented by its position in Fig. 1, relative to that of Fig. 2. As the arrangement is shown the quick-open and quick-release is such that the control handle need turn through a small arc—usually less than 180° between the two positions.

Carried upon the backing gate or backing plate are a series of laterally supported tape receiving arms or brackets 57. These arms form substantially a trough into which the tap 11 may be positioned and into which it may be rapidly loaded. It is usually desirable that one support bracket arm be located at either side of each magnetic head so that when the backing plate member is brought juxtaposed to the support housing or body the magnetic tape which has been positioned in the bracket arm will be caused to bow and move over the outer edge of each magnetic head as shown particularly by Fig. 2. In order that this form of arrangement may be provided, it is desirable to recess the support housing or body, such as has been conventionally represented at 59. The support bracket arms 57 then rest or move into these recesses 59 with a closure of the backing gate or backing plate 53 upon the body 25.

Roller or guide sleeves 61 are then supported by the backing gate or backing plate 43 behind each support arm bracket. These elements may actually be rollers or they may merely be polished or other anti-friction sleeves over which the tape is adapted to move. The purpose is that of providing a path of reduced friction for tape motion within the main body of the device.

Naturally, various forms of arrangements may be substituted for those herein set forth, but it is to be appreciated that the invention is so constituted that merely by moving the handle 51 to right or left as the case may be, the backing gate member or backing plate can be moved so as either to be brought close to the housing or moved away from it. In the indicated position of Fig. 1 the magnetic tape 11 may be merely dropped or placed into the angularly positioned support bracket arms 57 and then with a motion of the control handle in the counter-clockwise direction the backing plate may be closed upon the main body and the tape will be immediately located properly with respect to the various magnetic heads, so that the operation of erasing, recording or reproducing, or any of them, depending upon the number of such units in the device, may readily be accomplished.

Having now described the invention, what is claimed is:

1. A recording head assembly for permitting rapid threading of a tape strip within a recording device comprising a support housing having included therein at least one of a recording head, a reproducing head and an erasure head elements supported adjacent one another and relative to which a tape strip is to be positioned for utilization, a backing plate supported slidably upon the support housing and positioned normally adjacent thereto for holding the tape strip relative to the head elements, a plurality of laterally separated tape receiving arms brackets secured to the backing plate to support and locate a record tape placed therebetween, one of said brackets being located at each side of each head, and a quick-release gate mechanism to provide relative movement between the support housing and the backing plate to an extent sufficient to permit with the gate opening the rapid positioning of the recording strip on the brackets for threading relative to the head members and with the gate closure to place the located tape closely adjacent to the head members.

2. A device for supporting a tape arranged to be moved relative to a magnetic head comprising a main body wherein the magnetic head is supported, a backing plate slidably supported for adjustable positioning relative to the main body, a release mechanism arranged, in one position, to locate the backing plate and the main body juxtaposed to one another and, in a second position, to support the said backing plate and body in spaced relative relationship, and a plurality of tape receiving brackets of generally trough-shaped character supported from the backing plate and located therein at laterally displaced points from the position of the magnetic head so that with the backing plate supported in spaced relationship relative to the body a tape strip may rapidly be located, threaded and guided upon the brackets and when in juxtaposed location relative to the body the threaded tape strip will be caused to contact arcuately the edge surface of the magnetic head.

3. The device of claim 2 wherein the release mechanism comprises a rotatable cam.

4. The device of claim 2 wherein the release mechanism comprises a rotatable cam and means to rotate the cam through an arc of less than 180° to provide a shift in the location of the backing plate and body between an open and a closed state.

5. A device for supporting a tape relative to a magnetic head comprising a body wherein the magnetic head is positioned, a backing plate slidably supported upon the body and movable from a position substantially adjacent the body and the therein contained magnetic head to a position spaced therefrom, a plurality of tape holding and locating brackets supported by the backing plate and located on the plate at points spaced at either side of that whereat the plate and magnetic head are closest when the plate is adjacent the said body and head, said body also having recessed areas to receive the said tape locating elements with the backing plate in its closed position, a tape guide roller also supported on the backing plate so that in closed position a tape positioned and supported in the support brackets is guided over and in substantially arcuate contact with the magnetic head, and a release mechanism adapted in one position to hold the backing plate substantially adjacent to the body and in a second position to space the said backing plate and body relative to one another to permit rapid threading of a tape on the spaced tape support brackets.

6. A magnetic head assembly comprising a body having a plurality of magnetic heads supported thereon, a backing plate slidably supported on the body and movable between positions juxtaposed to the magnetic heads and spaced apart therefrom, a plurality of tape supporting brackets secured to the backing plate and having a trough-like tape receiving section into which a tape may be positioned when the backing plate is spaced from the body, one of said tape support brackets being located intermediate each magnetic head and one at each end of the plate so that a tape placed in the supports may be fed from one to another of the magnetic heads in sequence, said body having recesses into which said support brackets fit so that the backing plate and body may be juxtaposedly positioned and a tape supported upon the brackets is caused to bow over the magnetic heads, and a gate release mechanism for rapidly moving the backing plate and body relative to each other to permit rapid threading of the tape upon the tape support brackets.

7. The assembly claimed in claim 6 comprising, in addition, a guide roller supported on the backing plate opposite each tape receiving section to provide a bearing surface over which a supported tape is adapted to be drawn.

HAROLD W. LINDSAY.

REFERENCES CITED

The following references are of record in the file of this patent:

UNITED STATES PATENTS

| Number | Name | Date |
|---|---|---|
| 1,736,730 | E. Ponling et al. | Nov. 19, 1929 |